United States Patent [19]

McGill et al.

[11] 4,246,248

[45] Jan. 20, 1981

[54] SIMPLIFIED BATCH CLARIFICATION OF LIQUID AMMONIUM POLYPHOSPHATE

[75] Inventors: Kenneth E. McGill, Sheffield, Ala.; Eugene B. Wright, Jr., Lawrenceburg, Tenn.

[73] Assignee: Tennessee Valley Authority, Muscle Shoals, Ala.

[21] Appl. No.: 36,276

[22] Filed: May 7, 1979

Related U.S. Application Data

[63] Continuation-in-part of Ser. No. 949,723, Oct. 10, 1978, now Defensive Publication No. T986,010.

[51] Int. Cl.³ .................. C01B 15/16; C01B 25/26; C01B 25/16
[52] U.S. Cl. .................. 423/305; 423/321 S; 71/43
[58] Field of Search .................. 423/302, 305, 321 S, 423/321 R; 71/43

[56] References Cited

U.S. PATENT DOCUMENTS

| | | | |
|---|---|---|---|
| 3,630,711 | 12/1971 | Burkirt et al. | 423/302 |
| 3,969,483 | 7/1976 | Stinson et al. | 423/305 |
| 4,157,911 | 6/1979 | Murphy et al. | 423/305 X |

*Primary Examiner*—O. R. Vertiz
*Assistant Examiner*—Gregory A. Heller
*Attorney, Agent, or Firm*—Robert A. Petrusek

[57] ABSTRACT

Particulate carbonaceous matter in ammonium polyphosphate liquid made from impure wet-process phosphoric acid is removed batchwise by intimately mixing the liquid with a combination of selected organic flocculating agents and then allowing the mixture to separate. The particulate carbonaceous matter floats and the clarified liquid is withdrawn from the bottom of the separation vessel. The particulate carbonaceous matter, a minor portion of the input ammonium polyphosphate liquid, and the flocculating agents are intimately remixed with fresh black ammonium polyphosphate liquid to allow reuse of flocculant not combined with the original particulate carbonaceous material. The flocculants may be reused as many as five times. The particulate carbonaceous matter, the inactive flocculant, and a minor portion of the input ammonium polyphosphate liquid are then processed into fluid or solid fertilizers. In some instances, more flocculant is added to the mixing vessel.

16 Claims, 2 Drawing Figures

SIMPLIFIED BATCH CLARIFICATION OF LIQUID AMMONIUM POLYPHOSPHATE

The invention herein described may be manufactured and used by or for the Government for governmental purposes without the payment to us of any royalty therefor.

This application is a continuation-in-part of patent application Ser. No. 949,723, filed Oct. 10, 1978, now Defensive Publication No. T986,010, published Sept. 4, 1979.

Our invention relates to a method for the removal of particulate carbonaceous matter from ammonium polyphosphate liquids made from impure wet-process phosphoric acids. More particularly it relates to a new and improved method for batch clarification of ammonium polyphosphate liquids that involves flocculation of particulate carbonaceous matter to yield clear liquids; the particulate carbonaceous matter and a minor portion of the input ammonium polyphosphate liquids are recovered as a byproduct hereinafter referred to as "tops" and processed into fluid or solid fertilizers. Still more particularly our invention relates to the utilization of commercially available and relatively inexpensive organic compounds for the flocculation of the particulate carbonaceous matter in ammonium polyphosphate liquids.

The method for production of phosphoric acid commonly practiced by the fertilizer industry, and referred to as the "wet process," involves reaction of impure phosphate rock with sulfuric acid. The reaction mixture is filtered to remove calcium sulfate and yields a very impure phosphoric acid that contains a wide variety of impurities. The acid has a concentration of about 30 percent $P_2O_5$ (filter-grade acid) when produced and is usually concentrated to a $P_2O_5$ content of about 54 percent (merchant-grade acid) prior to shipment. This concentration has the effect of increasing the proportion of impurities that are present.

The impurities in wet-process acid vary depending principally upon the composition of the phosphate rock used. Calcium sulfate and various compounds of iron, aluminum, magnesium, and fluorine are the most prevalent impurities. Organic compounds also are present; these comprise organic materials originally present in phosphate rock and organic chemicals used in beneficiation of the rock prior to acid extraction. A portion of the impurities is present in solid form and a portion of the impurities is soluble in the acid. Impurities precipitate from the acid during storage and transportation to the user.

The most prevalent form of rock used in this country in the production of wet-process acid is mined in Florida. The rock is not now calcined prior to extraction and merchant-grade acid made from uncalcined rock is dark in color, often black, due to the presence of soluble and insoluble organic compounds. Calcination is costly and not suitable from the standpoint of conservation of energy since an expenditure of about 3 million Btu per ton of $P_2O_5$ is required.

Liquid mixed fertilizers having compositions similar to those of standard dry mixed fertilizers are well known in the industry and are increasing in popularity. Such solutions have the advantages over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers.

However, liquid fertilizers that contain all of their phosphorous values as ortho acyclic species have some outstanding disadvantages. The solutions are limited to a maximum plant food content of about 33 percent by weight because experience has taught that concentration in excess of this amount always has resulted in crystallization and precipitation of soluble salts. Furthermore, liquids that contain all of their phosphorus values as ortho acyclic species derived from phosphoric acid of the wet-process type contain precipitated metallic impurities orginally present in said wet-process phosphoric acid. These disadvantages, in many instances, outweighed the benefits derived by elimination of the evaporation and bagging steps associated with solid fertilizers.

In a fairly recent breakthrough in overcoming the disadvantages of liquid mixed fertilizers produced by the prior-art methods, there is found in application Ser. No. 835,377, John G. Getsinger, filed Aug. 29, 1959, the discovery that if phosphoric acid of the wet-process type containing up to a maximum of about 54 percent $P_2O_5$ is subjected to evaporating means, either at atmospheric or at reduced pressure, so as to condense the wet acid and raise its $P_2O_5$ content up to the range of approximately 60 to 76 percent $P_2O_5$, the formation of metallic precipitates which otherwise render wet-process phosphoric acid unusable for the preparation of liquid mixed fertilizers are substantially sequestered. In addition, there is taught in said application that if wet-process phosphoric acid is so concentrated, it may then be subsequently ammoniated to form liquid mixed fertilizers in which the metallic impurities originally present in said wet-process phosphoric acid remain sequestered and in solution. Substantially the same teachings wherein commercial grade wet-process phosphoric acid is concentrated and then subsequently ammoniated to form liquid mixed fertilizers is also found in U.S. Pat. No. 3,044,851, D. C. Young.

Still another and more recent breakthrough in overcoming disadvantages of the prior art enumerated supra is found in U.S Pat. No. 3,382,059, Getsinger, wherein he produces liquid fertilizers from orthophosphoric acid of the wet-process type and ammonia wherein he circumvents or eliminates the separate heating and concentrating step found in his earlier referred to application and the disclosure of Young. In this later work, Getsinger has discovered that by combining orthophosphoric acid of the wet-process type and anhydrous ammonia in a direct method he is able to utilize the autogenous heat of reaction therein to effect the release of water from such acid whereby same is condensed while it is being ammoniated to form directly, without the separate heating and concentrating step, ammonium polyphosphate solutions.

In a more recent breakthrough (U.S. Pat. No. 3,775,534) Meline discovered that ammonium polyphosphate liquids that contained at least 80 percent of the phosphorus values as nonortho acyclic species may be produced by direct ammoniation of wet-process superphosphoric acid that contained at least some of the phosphorus values as the nonortho acyclic species.

As may be seen from the disclosures enumerated supra, it is now known in the art how to produce liquid mixed fertilizers having plant nutrient values comparable to many standard dry mixed fertilizers, and in addition, to the preparation of said liquid fertilizers by such means and in such forms so as to substantially overcome many of the disadvantages originally inherent in the production of liquid fertilizers prior to the Getsinger disclosure. As may also be seen from a consideration of the economics involved, it is in many instances more highly desirable to produce such liquid mixed fertilizers by the ammoniation of wet-process superphosphoric acid rather than from the ammoniation of the cleaner, but more expensive, superphosphoric acid of the electric furnace type.

However, with all the disclosures enumerated supra for the production of liquid fertilizers, a disadvantage still exists in the production of liquid fertilizer utilizing phosphoric acid of the wet-process type produced from the most prevalent source of phosphate rock in this country (uncalcined Florida phosphate). Due to the presence of soluble and insoluble organic matter, liquid fertilizers made from such acid are black in color. This coloration can mask the presence of any undesirable precipitated or suspended material in the liquid which can result in difficulties in application of the liquid and, as a result, the consumer will not use these liquids except in the case of extreme emergency, and then only when no supply of clear liquid can be obtained.

It is an objective of the present invention to produce improved ammonium polyphosphate liquid from the impure liquid made with use of phosphoric acid produced from impure phosphate rocks, such as uncalcined Florida rock. These improved ammonium polyphosphate liquids are essentially free of insoluble organic carbonaceous matter and in a form highly acceptable to the consumer, a characteristic heretofore obtained only by use of the essentially pure electric furnace superphosphoric acid or the essentially carbonaceous-free acids made by use of calcined phosphate rocks.

Still further and more general objects and advantages of the present invention will appear from the more detailed description set forth below, it being understood, however, that this more detailed description is given by way of illustration and explanation only and not necessarily by way of limitation, since various changes therein may be made by those skilled in the art without departing from the true spirit and scope of the present invention.

The possible sources of organic matter in commercial wet-process phosphoric acids include the naturally occurring organic matter derived from the rock (hydrocarbons, unsaturated fatty acids, and degraded porphyrins), as well as the conditioning agents (fatty acids, tallow amines) and collecting agents (hydrocarbon oils, kerosene) that are used during the beneficiation steps. As a group, these organic materials are relatively inert neutral compounds that fall into solubility classes $N_1$ and $N_2$ (Schriner and Fuson, *Identification of Organic Compounds*, 2nd ed., John Wiley and Sons, New York, 1940), according to their solubility in reagent $H_3PO_4$. The neutral compounds that contain up to about 10 carbon atoms are soluble in reagent 80 percent $H_3PO_4$ (class $N_1$), whereas the longer-chain neutral compounds are not soluble (class $N_2$).

In merchant-grade wet-process acid, the insoluble organic matter is present principally as long-chain saturated fatty acids and waxy long-chain hydrocarbons. The soluble organic matter is of the same classes but of shorter chain length. On concentration of wet-process acid to the superphosphoric acid range (about 68 percent or more $P_2O_5$), significant amounts of the soluble short-chain organic matter is decomposed (charred) and polymerized with the result that an additional large amount of finely divided carbonaceous matter is formed that remains suspended in the acid or in ammonium polyphosphate liquids prepared from the acid. Further evidence of the partial decomposition (charring) and polymerization was shown by the retention of insoluble carbonaceous char in the equipment used in the identification study and the markedly greater hardness of the hydrocarbon waxes in comparison with those present in merchant-grade acid. The finely divided carbonaceous matter present in wet-process superphosphoric acid or in ammonium polyphosphate liquids produced from impure acids prepared from uncalcined phosphate rocks are extremely difficult to remove by filtration and settles at an extremely slow rate because of its small size.

The use of organic compounds per se for the clarification of wet-process acid or of ammonium polyphosphate solutions prepared from the acid is unknown. Ittlinger (U.S. Pat. No. 3,129,170) describes a process for clarification of shipping or merchant-grade wet-process phosphoric acids that contain suspended solid metallic and organic impurities. The process comprises addition of an amine clarification agent to increase the settling rate of the impurities followed by separation of the clarified fraction.

Ittlinger points out that the impurities present comprise calcium, iron and aluminum phosphates, double salts of iron and aluminum phosphates with phosphoric acid, and also some organic compounds. He states that these impurities "upon standing in storage or during shipment in tank cars or the like . . . deposit a layer of solid matter which renders handling of the stored or shipped acid exceedingly difficult and frequently economically unfeasible." He apparently had no idea of the problems that arise because of the presence of finely divided carbonaceous chars and other matter that are formed on production of superphosphoric acid or ammonium polyphosphate from wet-process merchant-grade acids. He was not concerned with treatment of a finely divided material which tended to remain suspended. Furthermore, clarification of wet-process phosphoric acid before it is processed into phosphatic solutions that contain polyphosphate is essentially useless with regard to eliminating the particulate black carbonaceous material since additional particulate carbonaceous material forms on heating to temperatures high enough to form polyphosphate. Therefore, to obtain a clear liquid phosphatic solution that is not black in color, clarification must occur after the polyphosphates are formed and at a low enough temperature not to degrade the flocculating agent before it has a chance to cause the black particulate carbonaceous material to float to the surface where it can be removed.

Burkert and Nickerson (in U.S. Pat. No. 3,630,711) describe a process for removing black particulate carbonaceous matter from 10-34-0 grade ammonium polyphosphate liquids which involves combining 0.1 to 0.6 percent by weight of a water-insoluble aliphatic amine with the liquid and then allowing the particulate carbonaceous matter to flocculate and float as a froth to the surface. They state that in their pilot-plant operation they prefer to employ agitator apparatus and introduce air through an air sparger during the mixing. They further state that the amine residue coats the carbonaceous solids, collects the air bubbles and rises to the surface in a froth. The froth is separated from the underflow. To secure a high recovery of $P_2O_5$ values the froth from the flotation step is diluted with water and refloated. Even then, Burker et al allowed for the further step of filtering the product underflow. In column 3, line 8, they state, ". . . the underflow which may contain a small amount of suspended solids may be filtered through a filter cloth tied about the product outlet pipe. For such filtration, we have found Nylon, Dynel, cotton, and other fabrics to be very useful." In examples of their process wherein they recovered high proportions of the input 10-34-0 clariifed product in short periods of time, they passed the treated liquid through a bag filter prior to the final cooling step.

Recently, Stinson et al (U.S. Pat. No. 3,969,483) utilized a combination of two flocculating agents, an aliphatic amine or aliphatic amine acetate and quaternary ammonium chloride, at addition rates significantly less than those utilized by Burkert et al, and obtained a synergistic effect thereby with the result that they caused black particulate carbonaceous matter to flocculate and rise to the surface of a more concentrated liquid fertilizer solution than described by Burkert and Nickerson, supra. Furthermore, by use of the combination of the organic flocculating agents, the entire clarification process is simplified by Stinson et al into one single separation stage instead of two or more stages (one or two separation stages and a filtering step) as described in '711, supra, without sacrifice of the recovery of clarified liquid fertilizer. Still further, the necessity for spraying air into the mixing and agitation portion of the process is eliminated. Still further yet in their new and novel single-stage separation process, Stinson et al teaches that the necessity for diluting the froth from intermediate steps with water to increase the recovery of clarified liquid to an economical level is eliminated. In U.S. Pat. No. 3,969,483, Stinson et al disclose one batch clarification method in which the mixer is operated continuously and is used to alternately fill two individual separation vessels. One of the two separation vessels is being filled while in the other previously filled one the liquid is being clarified. This prior procedure has the obvious disadvantage of requiring more equipment and thereby will be more costly to install than the procedure of the instant invention.

Our invention simplifies Stinson's process, supra, even more because:

(1) It allows the same flocculating agents to be exposed to several batches of black liquid fertilizer and thereby makes more effective use of the flocculants.

(2) It eliminates a separate mixer since both mixing and separation is carried out in the same vessel.

(3) It simplifies the mixing step since a commonly available agitator used in liquid or fluid fertilizer plants can usually provide enough intimate mixing for flocculation to occur.

(4) It allows the use of a separation vessel with essentially any type of configuration whereas in continuous-type operation, the separator diameter is critical (no more than about 200 pounds liquid per hour per square foot separator surface area). This parameter requires that a separator for continuous type operation be relatively wide but have a height:diameter ratio less than 1, which is not the usual and most economical design for tanks.

(5) It eliminates or simplifies supplementary equipment. Batch-type separators will not require a complicated feed liquid distributor nor a "tops" skimmer. No continuous-type flocculant metering system will be required since the flocculant can be added batchwise to the mixer. Also, control equipment, such as a level control device to locate the interface between the clarified and "tops" will not be needed since, in batch separation, it is not necessary to know the interface location except in the pump-out line when all of the clarified product has been withdrawn. The same pump can unload both "clarified liquid" and "tops" from the batch separator instead of needing a separate metering pump for the clarified liquid and another pump for the "tops."

Our invention, together with its desired objectives and further advantages thereof, will be better understood from a consideration of the following description taken in connection with the accompanying drawings in which.

Figure 1:
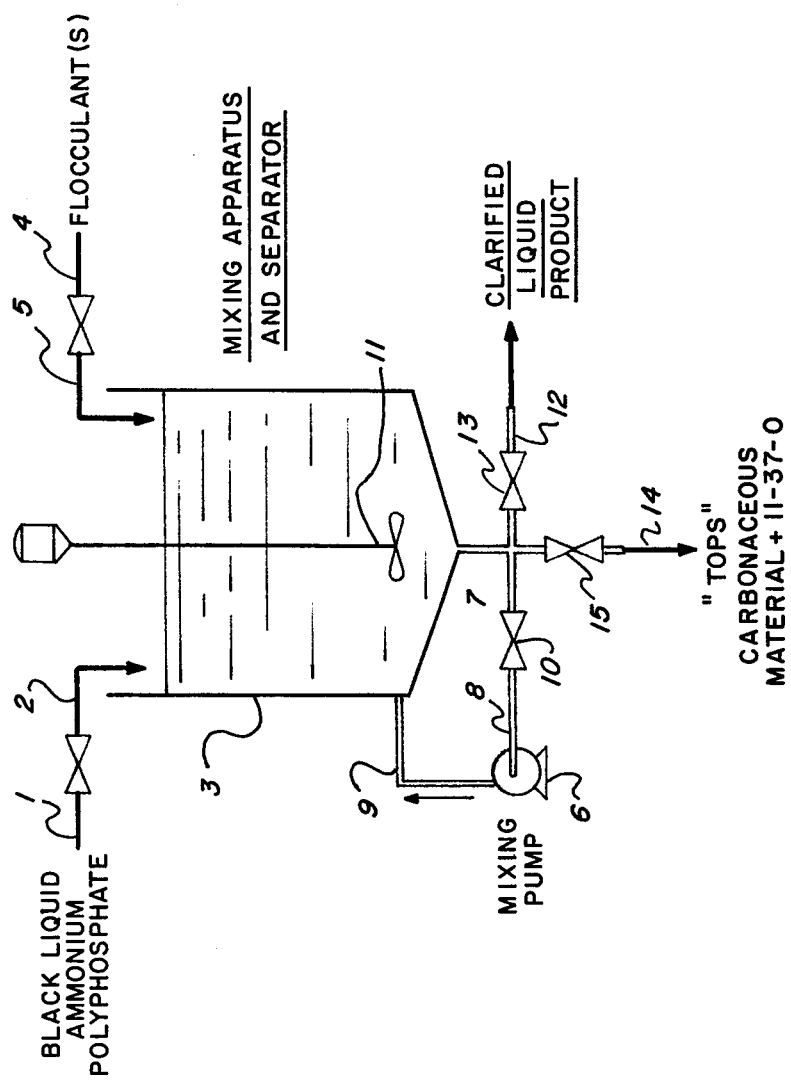
FIG. 1 is a flowsheet illustrating the principles of our novel process.

Referring now more specifically to FIG. 1, black liquid ammonium polyphosphate of the proper temperature to be clarified is fed from a source not shown via line 1 and means for control 2 into mixing apparatus and separator vessel 3. Flocculants from a source not shown are fed via line 4 and means for control of flow 5 into mixing apparatus and separator vessel 3. Mixing of the black liquid ammonium polyphosphate and flocculants is accomplished by either recirculating the liquid through mixing pump 6 via lines 7, 8, and 9 and means for control of flow 10, or by stirring the mixture in vessel 3 with agitator 11. Alternatively, mixing can be accomplished by operating both agitator 11 and pump 6 at the same time. This mixing action combines the flocculants with the black liquid fertilizer. After mixing for the desired time, the agitation and mixing is stopped and flocculated carbonaceous materials separate from the clarified product and float to the top of vessel 3. The clarified produce is then withdrawn from vessel 3 via lines 7 and 12 and means for control of flow 13 and then cooled by a source not shown before being transferred into suitable storage vessels not shown for subsequent sales. The black carbonaceous material and sufficient liquid to provide fluidity can remain in vessel 3 for several subsequent mixing and separation steps, after which steps said flocculated carbonaceous material is removed from vessel 3 via lines 7 and 14 and means for control of flow 15 and cooled by a source not shown before being stored in vessels not shown for subsequent use in other fertilizer processes. Alternatively, the flocculated carbonaceous material plus some residual liquid fertilizer can be processed into fluid fertilizers in vessel 3 by the addition of suspending clay or a nitrogen solution to produce a salable product.

DESCRIPTION OF THE PROCESS

The black liquid fertilizer of pH between 5.5 and 6.5 and of the proper temperature to be clarified is mixed with the proper amount of one or several flocculants in the mixing vessel. Agitation is stopped and the particulate black carbonaceous material floats to the surface along with essentially all of the flocculants. Both mixing and separation steps are carried out in the same vessel and after the particulate black material and flocculant float to the surface, the clarified liquid is withdrawn from the bottom of this vessel. Then a fresh charge of black ammonium polyphosphate liquid and, in some instances, more flocculant is added to the mixing vessel that contains the residual mixture of particulate carbonaceous matter, flocculant, and residual ammonium polyphosphate liquid remaining from the first charge and then mixing this entire mass together and then allowing the clarified liquid to separate and then withdrawing this clarified liquid and then repeating the above operation several times. Alternatively, the clarified liquid can be withdrawn from the vessel with subsequent removal of the residual mixture of particulate carbonaceous material, flocculant, and ammonium polyphosphate liquid.

The above methods of operation are examples of the way the process can be carried out and is not intended to limit the other possible methods that would also result in separation of the black particulate carbonaceous material from liquid fertilizer.

To enable testing of this process, liquid fertilizers were produced by the TVA pipe-reactor process (i.e., ammoniation of wet-process superphosphoric acid with anhydrous ammonia in a pipe followed by dissolution of the molten ammonium polyphosphate in sufficient ammonium hydroxide of the desired nitrogen content to give a liquid of the desired pH, density, and plant nutrient content) and various flocculants, as described in the following examples. In the operation of the batch-type process shown in FIG. 1, it has been found that there are several critical process variables that must be understood and that require the process to be operated in a prescribed manner in order for the liquid to be clarified in an efficient and economical manner. These process variables are (1) the length of time the flocculants are mixed with the black liquid, (2) mixing and separation temperature, (3) proportion of flocculants fed to the mixer, and (4) ratio of tallow amine:quaternary ammonium chloride. One process variable that was especially critical was the effect of mixing time on amount and clarity of clarified phosphatic fertilizer solution recovered.

The effect of mixing and storage temperatures were discussed earlier in U.S. Pat. No. 3,969,483, supra, and the information disclosed therein applies to the current studies. In summary, temperatures below about 125° F. are not effective because the flocculants are not fluid enough at low temperatures to mix well and high temperatures cause polyphosphate to hydrolyze rapidly, which is not desirable. Thus, temperatures between 125° F. and 175° F. are desirable and 125° F. was used in this work.

To study the effect of flocculant proportion and ratio, the following tests were made.

EXAMPLE I

In making these tests, five hundred gram portions of hot (125° F.) black 11-37-0 grade liquids were mixed with a mixture of two flocculants at 125° F. for 5 minutes with a Premier Series 2000 Dispersator equipped with a duplex head that rotated at 4000 revolutions per minute. The mixture in the mixing vessel was then placed in an oven set at 125° F. for 1 hour of quiescent storage. The clarified liquid (underflow) was removed from the vessel and a fresh charge of hot (125° F.) black 11-37-0 was added to the mixture of particulate carbonaceous matter, flocculant and residual 11-37-0 remaining from the first charge but no fresh flocculant was added. Then this entire mass was mixed for 5 minutes with the mixer described above and then stored for one hour in an oven at 125° F. The clarified product was then removed as described above. Results from these tests are shown in Table I, infra. In tests 1, 2, and 3, the proportion and amount of flocculants was varied. In test 4, five additional batches (500 gm per batch) of black 11-37-0 were added without adding any more flocculant, i.e., it was all added to the first batch, and operation was repeated as above to determine how many batches of black liquid could be clarified with one charge of flocculant.

The efficiency of the flocculants in causing the black particulate matter to rise and separate was determined by measuring the proportion of clarified liquid present 60 minutes after the mixing ceased, and hereafter called "recovery." The quality of the product liquid was evaluated by measuring the amount of light transmitted at a wavelength of 560 nanometers through a sample (½-inch diameter test tube) of clarified material and hereafter called "clarity." Distilled water was used as the standard for clarity and a Bausch and Lomb Spectronic 20 colorimeter was calibrated so that it allowed 100 percent of the light transmitted to pass through the sample of distilled water.

Data from tests made with freshly produced black 11-37-0 and these flocculants (table I below) show that good separation of carbonaceous matter occurred with the liquid tested when 0.3 to 1.5 pounds aliphatic tallow amine and from 0.1 to 1.5 pounds quaternary ammonium chloride were added to the initial batch and left in the vessel along with the carbonaceous matter and 11-37-0 from the first batch and no additional charges of flocculant was added in the second and subsequent batches. The products were satisfactorily clarified.

TABLE I

| | Flocculants[a] | | | | After 1 hour of quiescent storage | |
|---|---|---|---|---|---|---|
| | Lb ATA/ton 11-37-0[b] | | Lb QAC/ton 11-37-0[b] | | Recovery of clarified liquid, % by wt. | Percent light transmittance[c] through clarified liquid |
| Test No. | Input to mixer | Residual in separator | Input to mixer | Residual in separator | | |
| 1a | 1.5 | 1.5 | 1.5 | 1.5 | 78 | 41 |
| b | 0 | 1.2 | 0 | 1.2 | 85 | 39 |
| 2a | 1.5 | 1.5 | 0.1 | 0.1 | 79 | 14 |
| b | 0 | 1.2 | 0 | 0.08 | 83 | 25 |
| 3a | 0.3 | 0.3 | 1.5 | 1.5 | 77 | 20 |
| b | 0 | 0.2 | 0 | 1.2 | 73 | 39 |
| 4a | 1.5 | 1.5 | 1.5 | 1.5 | 81 | 47 |
| b | 0 | 1.3 | 0 | 1.3 | 87 | 50 |
| c | 0 | 1.1 | 0 | 1.1 | 80 | 49 |
| d | 0 | 1.0 | 0 | 1.0 | 64 | 51 |
| e | 0 | 0.8 | 0 | 0.8 | 67 | 57 |
| f | 0 | 0.7 | 0 | 0.7 | 0 | 0 |

[a] ATA = aliphatic tallow amine; QAC = quaternary ammonium chloride.
[b] 10.8-38.0-0 grade liquid (79 percent polyphosphate) produced at TVA from commercial wet-process superphosphoric acid from company A.
[c] Unclarified black liquid would allow no light (0 percent transmittance) to pass through while distilled water allows all light (100 percent transmittance) to pass through.

One of the flocculants tested was a primary aliphatic tallow amine with the major component being $C_{18}H_{35}NH_2$. It also contains a significant amount of amine with chain lengths of 16 carbon atoms, and as shown in the following typical chain length distribution data (table II below) furnished by the manufacturer, Armak Chemicals, Division of Akzona, Inc., contained no measurable amounts of amines with chain length in excess of 18 carbon atoms. This material is referred to by the manufacturer as Armeen T. Other manufacturers produce similar materials and refer to them by other designations. Armeen T is derived from tallow and contains all the chain lengths found in tallow from $C_{12}$ through $C_{20}$; the $C_{12}$ and $C_{20}$ are in trace amounts. Unsaturates in the amine will be different from those in the tallow because hydrogenation will convert some to the saturated component.

TABLE II

Typical Chain Length Distribution
(as determined by gas chromotography)

| Saturated | | Unsaturated | |
|---|---|---|---|
| Caproyl C-6 | — | Myristoleyl C-14' | 1.0 |
| Caprylyl C-8 | — | | |
| Capryl C-10 | — | Palmitoleyl C-16' | 3.0 |
| Lauryl C-12 | 1.0 | | |
| Myristyl C-14 | 3.0 | Oleyl C-18' | 37.0 |
| Pendadecyl C-15 | 0.5 | | |
| Palmityl C-16 | 29.0 | Linoleyl C-18' | 1.5 |
| Margaryl C-17 | 1.0 | | |
| Stearyl C-18 | 23.0 | | |

Another flocculant tested was a quaternary ammonium chloride which is a di(hydrogenated) dimethyl ammonium chloride compound and is reported by the manufacturer (Armak Chemicals, Division of Akzona, Inc.) to contain long-chain hydrocarbons in which the chain lengths vary primarily from 16 to 18 carbon atoms in length; a typical chain length analysis of the major components furnished by the manufacturer showed 24 percent hexadecyl, 75 percent octadecyl, and 1 percent octadecenyl. There are small amounts of $C_{12}$, $C_{14}$, $C_{15}$, $C_{17}$, $C_{20}$, etc. present. This flocculant is referred to by the manufacturer as Arquad 2HT-75. Other manufacturers produce similar materials and refer to them by other designations.

EXAMPLE II

Several tests (Nos. 5-8, table III below) were next made as in Example I except additional flocculant (from 0–0.7 pound ATA/ton liquid and 0 to 2 pounds QAC/ton liquid was added to the tops (carbonaceous matter, flocculant and residual 11-37-0) from the previous batch separation with the charge of black liquid. This operation was repeated several times with varying amounts of flocculant and shows that excellent clarification was obtained with this type operation.

TABLE III

| | Flocculants[a] | | | | | After 1 hour of quiescent storage | |
|---|---|---|---|---|---|---|---|
| | Lb ATA/ton 11-37-0[b] | | Lb QAC/ton 11-37-0[b] | | Recovery of clarified liquid, % by wt. | Percent light transmittance through clarified liquid |
| Test No. | Input to mixer | Residual in separator | Input to mixer | Residual in separator | | |
| 5a | 1 | 1 | 1 | 1 | 79 | 38 |
| b | 0.7 | 1.4 | 1 | 1.7 | 87 | 57 |
| 6a | 1.5 | 1.5 | 1.5 | 1.5 | 80 | 45 |
| b | 0 | 1.2 | 2.0 | 2.9 | 84 | 59 |
| 7a | 1.5 | 1.5 | 1.5 | 1.5 | 79 | 44 |
| b | 0 | 1.2 | 0 | 1.2 | 87 | 54 |
| c | 0 | 1.1 | 2.0 | 2.6 | 82 | 57 |
| d | 0 | 1.0 | 2.0 | 3.6 | 76 | 56 |
| 8a | 1.5 | 1.5 | 1.5 | 1.5 | 80 | 41 |
| b | 0 | 1.2 | 0 | 1.2 | 86 | 52 |
| c | 0 | 1.1 | 2.0 | 2.6 | 84 | 60 |
| d | 0 | 1.0 | 0 | 2.3 | 72 | 53 |

[a] ATA = aliphatic tallow amine; QAC = quaternary ammonium chloride.
[b] 10.8-38.0-0 grade liquid (79 percent polyphosphate) produced at TVA from commercial wet-process suerphosphoric acid from Company A.

To confirm the small-scale tests, which showed that mixing and separation could be carried out in the same vessel, two large-scale tests were made with nominal black 10-34-0 (68 percent polyphosphate level) made commercially in a pipe reaction system of TVA design. For the first one, 4.9 tons of preheated liquid (140° F.) was pumped to a commercial liquid suspension batch mixer and allowed to cool to 130° F. While both the agitator (14-inch diameter) and recirculating pump (360 gal/min) were operating, 10 pounds of flocculant[1] (125°–130° F.; 2 pounds total flocculant/ton liquid) was poured on the surface of the black 10-34-0 in the mixer. The flocculant and black 10-34-0 were mixed for 1 hour. After 1 hour of quiescent storage, the clarified liquid was discharged by gravity from the bottom of the mixer; 92 percent of the input black 10-34-0 (4.9 tons) was discharged as well clarified 10-34-0 (4.5 tons of liquid with 51–57 percent light transmittance) before the stream abruptly turned black and the flow was stopped.

[1] Flocculant (paste), 1:1 weight ratio of mixture of aliphatic tallow amine and quaternary ammonium chloride.

Figure 2:
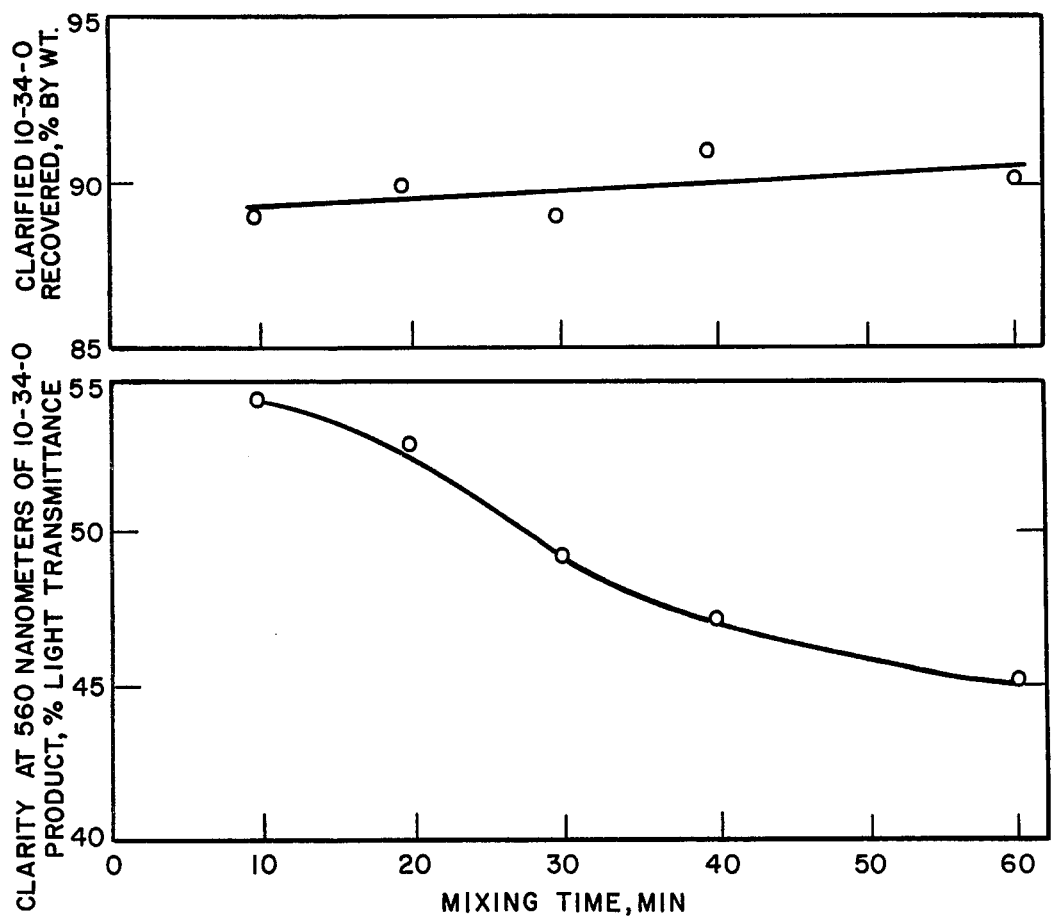
FIG. 2 is a graphical illustration of the effect of mixing time on product recovery and clarity obtained in tests with a commercial liquid suspension mixer.

Also, during this test 500-milliliter samples were taken after 10, 20, 30, 40, and 60 minutes of mixing to determine if less mixing would give good clarification. A water bath was used to maintain the temperature of the 500-milliliter samples at 125° F. After 1 hour of quiescent separation, evaluation of these samples showed that only 10 to 20 minutes of mixing was needed to give high (about 90 percent) recovery and good clarity (53–54 percent light transmittance) as shown in FIG. 2. However, the recovery and clarity of all the clarified products obtained after 10, 20, 30, 40, and 60 minutes were satisfactory.

The tops (800 pounds) from the first test was left in the tank and 5.0 additional tons of black 10-34-0 (130° F.), and an additional 10 pounds of flocculant were added to the mixer for the second test. This mixture was then agitated for 20 minutes and then allowed to separate for 1 hour in quiescent storage. The clarified liquid was then discharged by gravity but only 58 percent of the fresh black liquid was removed as clarified liquid (35–38 percent light transmittance) before the stream turned black. This recovery and clarity was not as good as was obtained from the first batch (92 percent recovery; 51–57 percent light transmittance) so the remainder of the liquid was left in the mixer overnight and then separated, which increased both the clarity (49–60 percent light transmittance) and recovery (87 percent).

EXAMPLE III

Tests were also made to study the effect of lowering the grade of the black liquid fertilizer on clarification. A black liquid fertilizer of 10.8-38.0-0 grade containing 79 percent polyphosphate was heated to reduce the polyphosphate level to 45 percent prior to dilution with water to an 8.0-27.9-0 grade and then clarified by the procedure described in Example I. Results of these tests are shown in table IV below. These tests show that liquid of lower grade than 10-34-0 or 11-37-0 can be clarified satisfactorily without changing the amount or type of flocculants or the flocculating procedure.

TABLE IV

| Test No. | Flocculants[a] | | | | After 1 hour of quiescent storage | |
|---|---|---|---|---|---|---|
| | Lb ATA/ton 8-27-0 | | Lb QAC/ton 8-27-0 | | Recovery of clarified liquid, % by wt. | Percent light transmittance through clarified liquid |
| | Input to mixer | Residual in separator | Input to mixer | Residual in separator | | |
| 9a | 1.5 | 1.5 | 1.5 | 1.5 | 86 | 13 |
| b | 0 | 1.3 | 0 | 1.3 | 80 | 36 |

[a]ATA = aliphatic tallow amine; QAC = quaternary ammonium chloride.

EXAMPLE IV

Two flocculants, an acetic salt of an aliphatic amine and a quaternary ammonium chloride were next tested with black 11-37-0 from same batch as used in Example I also using the procedure described in that example except that the mixing and quiescent storage temperature were higher (170° F. versus 125° F.) because the acetate salt (paste) has a high melting point (140° F.). The acetate salt reported by the manufacturer (Armak Chemicals, Division of Akzona, Inc.) mostly contains from 16 to 18 carbon atoms. A typical chain length analysis furnished by the manufacturer shows 25 percent of hexadecyl, 72 percent of octadecyl, and 3 percent of octadecenyl and is referred to as Armac HT.

Data from tests with these flocculants which are summarized in table V below show that excellent clarification was obtained with use of the acetate salt of the aliphatic amine (Armak HT) when used at a rate of 1.5 pounds per ton of black 11-37-0 in combination with the 1.5 pounds of quaternary ammonium chloride per ton of black 11-37-0.

TABLE V

| Test No. | Flocculants[a] | | | | After 1 hour of quiescent storage | |
|---|---|---|---|---|---|---|
| | Lb AS/ton 11-37-0[b] | | Lb QAC/ton 11-37-0[b] | | Recovery of clarified liquid, % by wt. | Percent light transmittance through clarified liquid |
| | Input to mixer | Residual in separator | Input to mixer | Residual in separator | | |
| 10a | 1.5 | 1.5 | 1.5 | 1.5 | 79 | 42 |
| b | 0 | 1.2 | 0 | 1.2 | 85 | 50 |

[a]AS = Acetate salt of aliphatic amine; QAC = quaternary ammonium chloride.
[b]10.8-38.0-0 grade liquid (79 percent polyphosphate) produced at TVA from commercial wet-process superphosphoric acid from company A.

After sifting and winnowing through the data supra, as well as other results of tests and operation of our new, novel, and improved method for batch clarification of ammonium polyphosphate liquids, we now present the accepted and preferred parameters and variables as shown below.

| Process Variables | Operating range | Preferred Operating range |
|---|---|---|
| Black liquid fertilizer | | |
| Grade | 8-24-0 to 11-37-0 | 10-34-0 to 11-37-0 |
| Polyphosphate level, % of total P₂O₅ | 45–90 | 70–80 |
| pH | 5.5–7.0 | 6.0–6.6 |
| Flocculant | | |
| Temperature, °F. | 32–180 | 80–130 |
| Lb. primary amine/ton liquid fertilizer | | |
| Input to mixer | 0[a]–1.5 | 1.0–1.5 |
| Residual in separator | 0[a]–1.5 | 1.0–1.5 |
| Lb. quaternary ammonium chloride/ton liquid fertilizer | | |
| Input to mixer | 0.1–2.0 | 1.0–1.5 |
| Residual in separator | 0.08–3.6 | 1.0–1.5 |
| Lb. acetic acid salt of primary amine/ton liquid fertilizer | | |
| Input to mixer | 0[a]–1.5 | 0[a] |
| Residual in separator | 0[a]–1.5 | 0[a] |
| Mixing apparatus | | |
| Retention time, minutes | 1–60 | 2–30 |
| Temperature, °F. | 100–180 | 120–150 |
| Separator | | |
| Retention time, minutes | 15–120 | 60–120 |
| Temperature, °F. | 100–180 | 120–150 |

[a]In our process we can add in combination with the quaternary ammonium chloride either a primary amine or an acetic acid salt of a primary amine. When we add one or the other in combination with the chloride, the amount of the one not added, of course, will be zero. In either instance, the minimum amount of primary amine or acetic acid salt added is about 0.3 lb./ton of liquid fertilizer.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In an improved multiple-step process for the removal of carbonaceous matter from ammoniated polyphosphate solutions wherein:

said solutions have a pH above about 4.5;

said solutions are prepared by the molecular dehydration and subsequent or concurrent ammoniation of wet-process phosphoric acid containing about 50 to 72 percent $P_2O_5$;

said carbonaceous matter results from organic impurities in said wet-process phosphoric acid;

said carbonaceous matter chars during the molecular dehydration of said wet-process orthophosphoric acid to superphosphoric acid;

the improvement in combination therewith for removing substantially all of the black particulate carbonaceous matter therein by flocculation and subsequent flotation, thereby eliminating any requirement for filtering means therein, which improvement comprises the steps of: adding to the black ammoniated polyphosphate solution from about 0.015 to about 0.075 percent by weight of a water-insoluble primary amine having a lower density than the ammoniated polyphosphate solution and essentially immiscible therewith; adding to the solution from about 0.005 to about 0.075 percent by weight of a water-insoluble quaternary ammonium chloride having a lower density than the ammoniated polyphosphate solution and essentially immiscible therewith; agitating the resulting mixture to bring said amine and said quaternary into intimate contact with said solution; holding the solution until the solids flocculate and float to the surface; and separating the resulting flocculated solids from the underflow by removing the underflow from the lower portion of the container into which said ammoniated polyphosphate solution was introduced; subsequently adding to said container an additional predetermined amount of black ammoniated polyphosphate solution; agitating the resulting mixture of black ammoniated polyphosphate solution and said flocculated solids to bring the residual amine and quaternary ammonium chloride in said flocculated solids into intimate contact with said black ammoniated polyphosphate solution; holding the resulting mixture until the solids therein flocculate and float to the surface; and separating the resulting flocculated solids from the underflow.

2. The process of claim 1 wherein the following steps are repeated three to five times: adding to said container additional predetermined amounts of black ammoniated polyphosphate solution; subsequently agitating the resulting mixture of black ammoniated polyphosphate solution and said flocculated solids to bring same into intimate contact; holding the resulting mixture until the solids therein flocculate and float to the surface; and subsequently separating the resulting separated flocculated solids from said underflow.

3. The process of claim 1 wherein from about 0.015 to about 0.05 percent by weight of water-insoluble primary amines and from 0.005 to about 0.05 percent by weight of water-insoluble quaternary ammonium chloride is added to the initial charge of ammoniated polyphosphate solution in said container, and from about 0.015 to about 0.035 percent amine and from about 0.005 to about 0.25 percent quaternary ammonium chloride is subsequently added to the second charge of black ammoniated polyphosphate solution subsequently added to said container.

4. The process of claim 1 wherein from about 0.005 to about 0.1 percent by weight of additional quaternary ammonium chloride is added to said additional charges of black ammoniated polyphosphate solution introduced into said container subsequent to the first separation of the flocculated solids from the underflow.

5. The process of claim 1 wherein from about 0.005 to about 0.1 percent by weight of additional quaternary ammonium chloride is added to said additional charges of black ammoniated polyphosphate solution introduced into said container subsequent to the second separation of the flocculated solids from the underflow.

6. The process of claim 1 in which said ammoniated polyphosphate solution has a pH range from about 5.5 to about 6.5 and contains from about 45 to about 90 percent by weight of the total $P_2O_5$ as nonorthophosphate.

7. The process of claim 1 in which said primary amine has alkyl groups with hydrocarbons with chain lengths of about 12 to about 20 carbon atoms and in which said quaternary is a dialkyl dimethyl ammonium chloride having hydrocarbons with chain lengths of about 16 to about 18 carbon atoms.

8. The process of claim 1 in which said ammonium polyphosphate solution ranges from about 8-24-0 to about 11-37-0.

9. In an improved multiple-step process for the removal of carbonaceous matter from ammoniated polyphosphate solutions wherein:
said solutions have a pH above about 4.5;
said solutions are prepared by the molecular dehydration and subsequent or concurrent ammoniation of wet-process phosphoric acid containing about 50 to 72 percent $P_2O_5$;
said carbonaceous matter results from organic impurities in said wet-process phosphoric acid;
said carbonaceous matter chars during the molecular dehydration of said wet-process orthophosphoric acid to superphosphoric acid;
the improvement therein for removing substantially all of the black particulate carbonaceous matter therein by flocculation and subsequent flotation, thereby eliminating any requirement for filtering means therein, which improvement comprises the steps of: adding to the solution from about 0.015 to about 0.075 percent by weight of a water-insoluble acetic acid salt of a primary amine having a lower density than the ammoniated polyphosphate solution and immiscible therewith; adding to the solution from about 0.005 to about 0.075 percent by weight of a water-insoluble quaternary ammonium chloride having a lower density than the ammoniated polyphosphate solution and immiscible therewith; agitating the resulting mixture to bring said amine and said quaternary into intimate contact with said solution; holding the solution until the solids flocculate and float to the surface; and separating the resulting flocculated solids from the underflow by removing the underflow from the lower portion of the container into which said ammoniated polyphosphate solution was introduced; subsequently adding to said container an additional predetermined amount of black ammoniated polyphosphate solution; agitating the resulting mixture of black ammoniated polyphosphate solution and said flocculated solids to bring the residual amine and quaternary ammonium chloride in said flocculated solids into intimate contact with said black ammoniated polyphosphate solution; holding the resulting mixture until the solids therein flocculate and float to the surface; and separating the resulting flocculated solids from the underflow.

10. The process of claim 9 wherein the following steps are repeated three to five times: adding to said container additional predetermined amounts of black ammoniated polyphosphate solution; subsequently agitating the resulting mixture of black ammoniated polyphosphate solution and said flocculated solids to bring same into intimate contact; holding the resulting mixture until the solids therein flocculate and float to the surface; and subsequently separating the resulting separated flocculated solids from said underflow.

11. The process of claim 9 wherein from about 0.015 to about 0.05 percent by weight of water-insoluble primary amines and from 0.005 to about 0.05 percent by weight of water-insoluble quaternary ammonium chloride is added to the initial charge of ammoniated polyphosphate solution in said container, and from about 0.015 to about 0.035 percent amine and from about 0.005 to about 0.25 percent quaternary ammonium chloride is subsequently added to the second charge of black ammoniated polyphosphate solution subsequently added to said container.

12. The process of claim 9 wherein from about 0.005 to about 0.1 percent by weight of additional quaternary ammonium chloride is added to said additional charges of black ammoniated polyphosphate solution introduced into said container subsequent to the first separation of the flocculated solids from the underflow.

13. The process of claim 9 wherein from about 0.005 to about 0.1 percent by weight of additional quaternary ammonium chloride is added to said additional charges of black ammoniated polyphosphate solution introduced into said container subsequent to the second separation of the flocculated solids from the underflow.

14. The process of claim 9 in which said ammoniated polyphosphate solution has a pH range from about 5.5 to about 6.5 and contains from about 45 to about 90 percent by weight of the total $P_2O_5$ as nonorthophosphate.

15. The process of claim 9 in which said acetic acid salt of a primary amine has alkyl groups with hydrocarbons with chain lengths of about 12 to about 18 carbon atoms and in which said quaternary is a dialkyl dimethyl ammonium chloride having hydrocarbons with chain lengths of about 16 to about 18 carbon atoms.

16. The process of claim 9 in which said ammonium polyphosphate solution ranges from about 8-24-0 to about 11-37-0.

* * * * *